(12) United States Patent
Weichholdt

(10) Patent No.: US 6,829,879 B2
(45) Date of Patent: Dec. 14, 2004

(54) RELEASABLE FASTENING ARRANGEMENT FOR STRAW CHOPPER BLADE

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 30 days.

(21) Appl. No.: 10/319,771

(22) Filed: Dec. 13, 2002

(65) Prior Publication Data

US 2003/0125098 A1 Jul. 3, 2003

(30) Foreign Application Priority Data

Dec. 15, 2001 (DE) .......................................... 101 61 714

(51) Int. Cl.[7] .............................................. A01D 34/42
(52) U.S. Cl. ........................................ 56/504; 460/112
(58) Field of Search .................. 56/504, 294; 241/197; 411/555, 229, 399, 549, 553, 388, 384; 460/112; 403/408.1, 256, 258, 261, 245

(56) References Cited

U.S. PATENT DOCUMENTS

| | | | | |
|---|---|---|---|---|
| 2,332,752 A | | 10/1943 | Ratcliff | 287/20 |
| 2,386,729 A | * | 10/1945 | Watter | 411/338 |
| 2,986,186 A | | 5/1961 | White | 146/121 |
| 3,309,854 A | * | 3/1967 | Mitchell et al. | 56/504 |
| 3,606,748 A | * | 9/1971 | Middlesworth | 56/294 |
| 4,442,571 A | | 4/1984 | Davis et al. | 411/552 |
| 5,482,508 A | * | 1/1996 | Redekop et al. | 460/112 |
| 6,070,816 A | | 6/2000 | Hirsch | 241/101.742 |
| 6,511,374 B2 | * | 1/2003 | VanEe | 460/112 |

FOREIGN PATENT DOCUMENTS

| | | |
|---|---|---|
| DE | 946 751 | 7/1956 |
| DE | 1 900 078 | 9/1969 |
| DE | 2 305 157 | 8/1973 |
| DE | 75 30 714 | 2/1976 |
| DE | 36 31 485 C2 | 3/1988 |
| DE | 41 28 661 A1 | 3/1993 |
| DE | 299 17 723 U1 | 3/2000 |
| DE | 696 10 526 T2 | 5/2001 |
| GB | 2 70 167 | 5/1927 |
| GB | 2 090 627 A | 7/1982 |
| WO | 91/10351 | 7/1991 |

* cited by examiner

Primary Examiner—Árpád Fabián Kovács

(57) ABSTRACT

A fastening arrangement for fastening a blade to a rotor of a straw chopper. The fastening arrangement comprising a bolt that is inserted into a blade hole in the blade and into a plate hole in a mounting plate extending from the rotor and into a retaining element that retains the bolt in the holes. The retaining element can be separated from the bolt. The bolt and the retaining element are fixed against rotation by the mounting plate.

19 Claims, 4 Drawing Sheets

RELEASABLE FASTENING ARRANGEMENT FOR STRAW CHOPPER BLADE

FIELD OF THE INVENTION

The present invention is directed to a fastening arrangement for a blade to a rotor of a straw chopper, wherein a bolt is inserted into a blade hole in the blade and a plate hole in a mounting plate extending from the rotor whose end is connected to a retaining element that retains the bolt in the holes, but can be separated from the bolt.

BACKGROUND OF THE INVENTION

In straw chopper attachment implements in use today (see DE 36 31 485 C) the blades of the chopper are pendulously supported with screws and stop nuts to mounting plates, that extend from the chopper rotor. In order to attain a certain quality of the chopper performance and to keep the power requirement of the chopper within limits, the blades, that are ground on both sides, are disassembled after approximately 100 to 200 hours of operation and reassembled after the blades have been inverted. After this operating time the edge of the knife is dull, as a rule, so that the length of cut grows and the power requirement increases considerably. After a further 100 to 200 hours of operation the old blades are replaced with new blades. During the attachment and removal of the screws the operator must rotate the screw with a wrench held in one hand and hold a wrench with the other hand with which he holds the nut against rotation.

A disadvantage of the fastening with screws and stop nuts lies in the great amount of time that is required for the replacement or the inversion of the blades. For this operation the standard is approximately four hours for a complete exchange for a combine with six straw walkers.

U.S. patent application Ser. No. 10/230,694, filed Aug. 29, 2002 discloses other fastening arrangements are proposed for the fastening of the blades of a straw chopper. In a first embodiment a bolt is inserted through holes in the blades and in the mounting plate and locked by a pin that can be inserted through a radial opening in the bolt. A spring draws the pin against a retaining element. In a second embodiment the pin is locked to the bolt. The bolt is inserted axially into the retaining element and rotated through 90° into its locking position in which a spring draws the pin into a recess in the retaining element. This fastening arrangement relieves the service personnel the task of loosening and tightening the screws. The bolt and the retaining element are pendulously supported on the mounting plate. Therefore during the insertion of the pin or the bolt it becomes necessary to rotate the bolt or the retaining element in order to bring it into a position in which the elements can be inserted into the associated openings. Furthermore a tool is required to compress the spring in order to be able to rotate the bolt between the releasing and locking position.

The problem underlying the invention is seen in the need to define an improved fastening arrangement for blades on a chopper rotor.

SUMMARY OF THE INVENTION

It is proposed that the bolt and/or the retaining element be connected, fixed against rotation, in the mounting plate relative to the direction of the axis of the hole in the mounting plate directly or indirectly. Thereby the bolt or the retaining element cannot rotate about their longitudinal axis relative to the mounting plate. In the locked position as a rule the bolt as well as the retaining element are connected to the mounting plate, fixed against rotation—that is, in each case the element fixed against rotation relative to the mounting plate.

In this way the result is a defined azimuthal orientation of the retaining element and/or of the bolt relative to the mounting plate. If the retaining element and the bolt are moved by a relative rotation between the loosening and the locked position, it is no longer necessary to hold in the retaining element or the fixed bolts, while the bolt or the retaining element is rotated. In an embodiment with a pin that can be inserted into the bolt and that is used to connect the bolt and the retaining element, which is forced into the locked position by the force of a spring, the result is a defined azimuthal orientation of the bolt and/or the retaining element, so that upon the insertion of the pin a rotation of these elements can be omitted which would have brought these into an orientation in which the pin can be inserted. This is useful particularly if the pin can be inserted only with a certain orientation of the bolt and the retaining element. The inverting or the replacement of the blades can be performed considerably simpler and faster.

Fundamentally it does not matter whether the bolt or the retaining element is connected to the mounting plate, to be fixed against rotation. For example, the bolt may be a screw with a four-sided shank that extends through a square hole in the mounting plate. At its end away from its head a nut is then screwed onto a thread as retaining element. In another embodiment the retaining element is connected to the mounting plate, fixed against rotation. For this purpose a part of the retaining element that can be inserted into the hole of the mounting plate and the hole itself in the mounting plate are equipped with matching non-circular cross sections. The cross sections may, for example, be elliptical or rectangular, particularly square. In this embodiment the bolt is connected to the retaining element, for example, by a screw thread, so that it can be removed.

In the last named embodiment the bolt can extend through an axial opening in the retaining element and can be connected with the retaining element, particularly on its outer side.

The blade or blades that is or are pendulously suspended in a manner known in itself are preferably supported in bearings on sleeves that enclose the retaining element or the bolt. The use of the sleeves makes it possible to replace in the case of excessive wear without any excessive cost the bearing surfaces on which the blades rotate, and that wear down gradually during the operation of the chopper. Most appropriately the sleeves are connected with the mounting plate, fixed against rotation, in order to prevent their rotation relative to the mounting plate and bring about a separation of the retaining element and the bolt.

The bolt that can be inserted through the mounting plate of the rotor and the blade hole in the blade can preferably be moved between a released position and a locked position by a rotation relative to the retaining element, where it does not matter whether the bolt or the retaining element is the one that is rotated. In the release position the retaining element can be separated from the bolt and mounted on it. In the locked position the retaining element cannot be separated from the bolt. An attachment of the retaining element to the bolt by means of a screw thread would be conceivable but has the disadvantage that the assembly and disassembly is relatively time consuming. Therefore it is proposed that the bolt and the retaining element can be moved between the release position and the locked position by a rotation through less than 360°. For this purpose a type of bayonet fastening can be provided between the retaining element and the bolt.

Preferably the retaining element and the bolt are retained by a spring in the locked position. For the inversion or the replacement of the blades the force of the spring must first be overcome in order to bring the retaining element and the bolt into the release position. With appropriate dimensioning of the spring an unintended release of the fastening arrangement need not be feared.

The arresting of the bolt at the retaining element can be performed in various ways. It would be possible, for example, to use a locking element extending radially from the bolt, where the bolt is moved between release position and locked position by rotation about its axis. The locking element is retained by a spring in the locked position in which it is forced against the retaining element, particularly into a recess arranged at that location. In the release position the bolt can be extracted axially through an opening provided at that location. The embodiment described here is disclosed in greater detail in U.S. patent application Ser. No. 10/230,694 filed Aug. 29, 2002, whose teaching is incorporated into the present disclosure by reference. This makes possible a simple and rapid locking of the fastening arrangement, however it is necessary to pre-load the spring, for which corresponding tools are required. In a preferred further development of the invention it is therefore proposed that the retaining element be provided with a helically shaped surface which is in contact with the locking element that is connected with the bolt. The helically shaped surface has the effect of operating in the form of a screw so that the spring is loaded or released when the bolt is rotated. A separate tool for loading the spring can be omitted, so that only a single tool is required for the rotation of the bolt.

In the locking position the locking element is preferably located in a recess at the end of the helical surface. The spring draws, presses or rotates the locking element into the recess. It is there arrested, fixed against rotation about its axis. The recess is preferably only so deep and/or chamfered in such a way that the bolt can be rotated into the loosened position in order to unload the spring without the use of any tool.

The bolt is inserted most appropriately into the retaining element in the axial direction. For this purpose the retaining element is provided with an axial opening that conforms to the cross section of the bolt to which the locking element is fastened.

DETAILED DESCRIPTION

Figure 1:
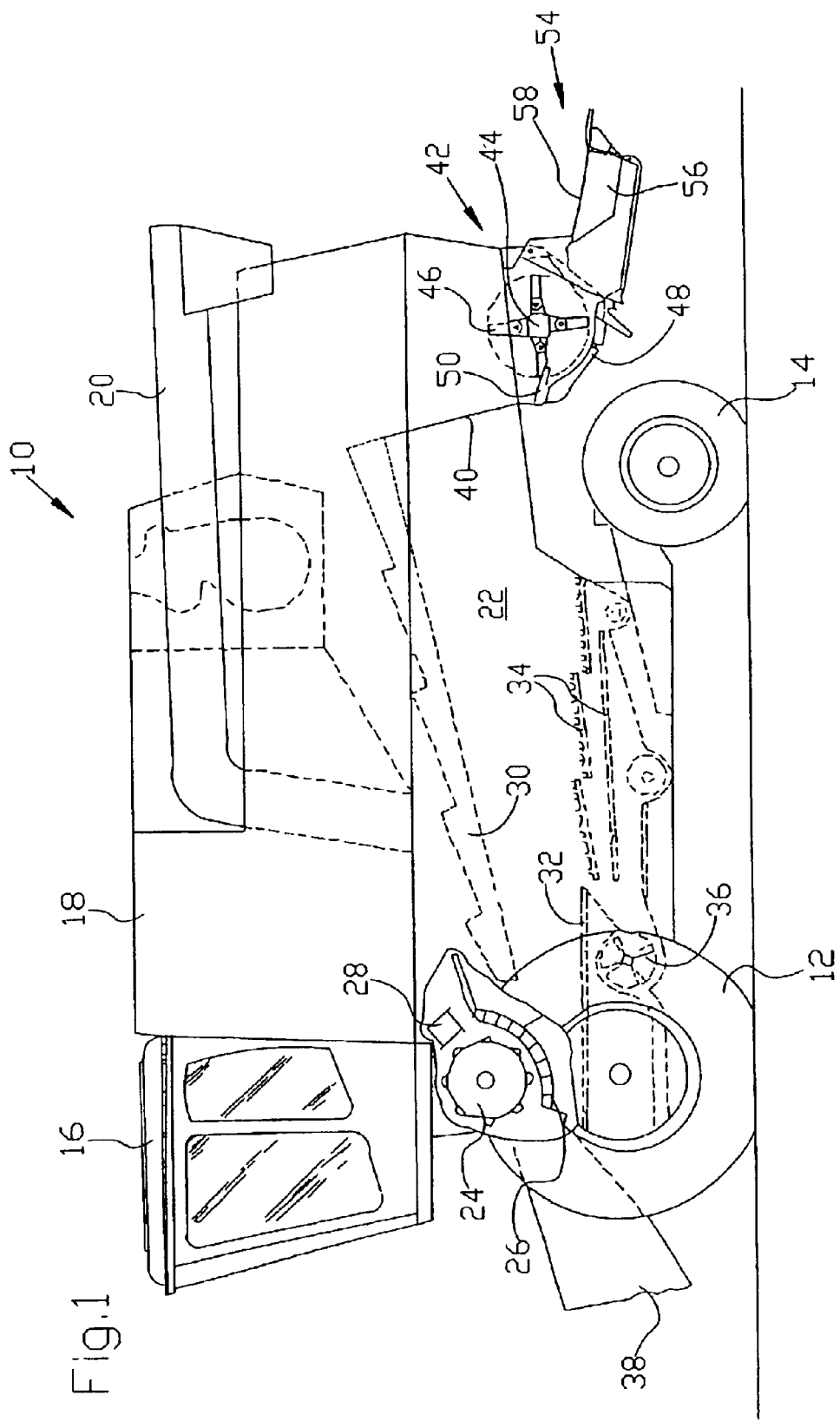
FIG. 1 is a semi-schematic side view of a harvesting machine with a straw chopper.

A harvesting machine 10 shown in FIG. 1 in the form of a combine is supported on front driven and rear steer able wheels 12 and 14 and is provided with an operator's cab 16 from which it can be controlled by an operator. A grain tank 18 is located behind the operator's cab 16. Grain temporarily stored in the grain tank 18 is discharged into a grain cart or truck by an unloading auger 20. The grain tank 18 is supported on a frame 22 formed by two side sheets. Crop harvested by a harvesting assembly, not shown, is directed into the combine by feeder house 38. The harvested crop is directed to a threshing assembly. In the illustrated embodiment the threshing assembly comprises a transverse threshing cylinder 24 and associated concave 26. A transverse beater 28 directs the large components of the threshed crop to straw walkers 30. The grain and chaff released from the harvested crop is directed to the grain pan 32 by the concave 26 and the straw walkers 30. The grain pan 32 directs the grain and chaff to the cleaning assembly. The cleaning assembly comprises a series of sieves 34 which receive the grain and chaff a cleaning fan 36 directs an air blast upwardly through the sieves to separate the chaff from the grain. The chaff being blown out the rear of the combine. The clean grain is collected on the floor of the combine and directed upwardly by an elevator, not shown, to the grain tank 18. The large components of the harvested crop are conducted over the straw walkers 30 over a straw guide vane 40 to a straw chopper 42.

The straw chopper 42 includes a hollow cylindrical rotor 44 with blades 46 distributed around its circumference and over its length that are pendulously suspended on the rotor 44. The rotor 44 is rotated in a housing 48 about an approximately transverse horizontal axis. The rotating blades 46 coupled to the rotor 44 in combination with the shear bars 50 reduces the size of the threshed-out large crop components. A distributing arrangement 54 is arranged downstream from the straw chopper 42. the distributing arrangement 54 comprises a number of guide arrangements 56 arranged alongside each other in the form of straw guide vanes that are mounted underneath a straw distributor hood 58.

Figure 2:
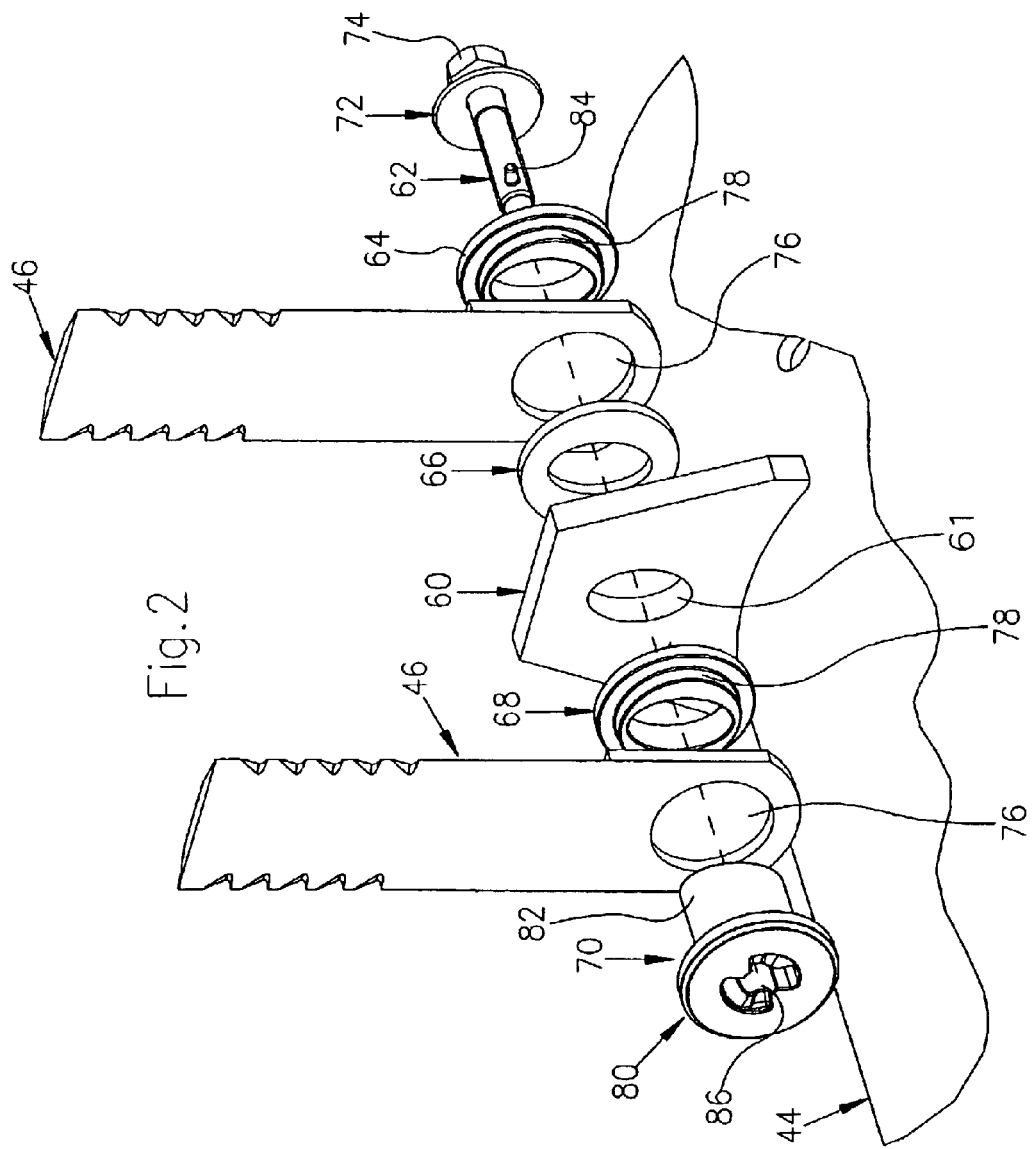
FIG. 2 is an exploded perspective view of a first embodiment of a fastening arrangement for the blades of the straw chopper.

The present invention is directed to a fastening arrangement for the blades 46 to the rotor 44. FIG. 2 shows an exploded view of a first embodiment of such a fastening arrangement. The blades 46 that are equipped on their longitudinal sides and preferably on their outer ends with ground edges are fastened in pairs to a mounting plate 60 that is welded to the rotor 44 or fastened by other means. One blade 46 is located on each side of the mounting plate 60. More than two blades 46 could also be fastened to the mounting plate 60. The mounting plate 60 extends in the direction of rotation of the rotor 44. The mounting plate 60 is provided with a hole 61 extending in the axial direction of the rotor 44.

The blades 46 are fastened to the mounting plate 60 by a bolt 62, two sleeves 64 and 68, a spacer 66 as well as a retaining element 70. A Belleville spring 72 can be applied to the bolt 62 and is in contact with its head 74. In the assembled condition the shank of the bolt 62 extends through a central hole in the spring 72, a central opening in the first bushing 64, a blade hole 76 in the first blade 46, an opening in the first spacer 66 that is formed in the shape of a washer, a plate hole 61 in the mounting plate 60, a central opening in the second sleeve 68, a blade hole in the second blade 46 and through the retaining element 70.

Each of the blade holes in the blades 46 engage circular cylindrical sections 78 of the sleeves 64 and 68. On the sections 78 the blades 46 are pendulously supported, so they are free to rotate about the longitudinal axis of the bolt 62.

At the end remote from the head 74 of the bolt 62 the retaining element 70 is provided with a ring-shaped head 80 projecting radially that projects from an axial shank 82 of the retaining element 70. The length of the shank 82 of the retaining element 70 is dimensioned in such a way that in the assembled condition of the fastening arrangement, the shank 82 extends through the second sleeve 68, the plate hole 61 in the mounting plate 60, through the spacer 66 and the first sleeve 64. Here the blade holes 76 of the blades 46 are arranged on the circular cylindrical sections 78 of the sleeves 64 and 68. The cross sections of the shank 82, the sleeves 64 and 68, the plate hole 61 and the spacer 66 are not circular, but are selected as elliptical in shape and conform at least approximately with each other. Thereby the result is that the retaining element 70 is coupled, fixed against rotation, to the mounting plate 60, as soon as the shank 82 is inserted into the plate hole 61. It cannot rotate about its longitudinal axis. The sleeves 64 and 68 and the spacer 66 are also fixed to the mounting plate 60 about its axis by means of the retaining element 70 as soon as they are applied to the shank 82 of the retaining element 70 and the latter is located on the mounting plate 60.

The bolt 62 is removable fastened to the retaining element 70 by a pin-shaped locking element 84, which is rigidly connected to the bolt 62, and extends radially from the bolt 62 in the vicinity of the end remote from the head 74. The bolt 62 can be inserted into the retaining element 70 through an axial opening 86 of the retaining element 70 that conforms to the cross section of the bolt 62 and the locking element 84. The opening 86 has the shape of a keyhole for a key with keybits located diametrically opposite each other.

Figure 3:
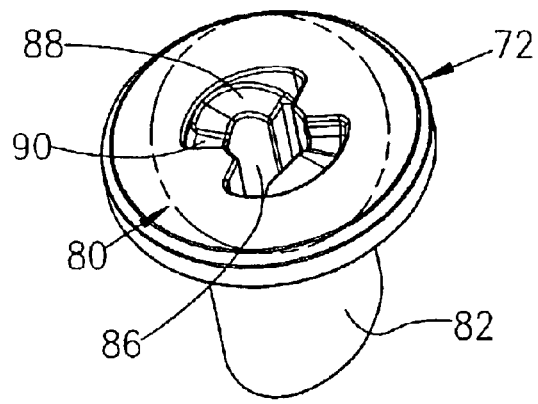
FIG. 3 is an enlarged perspective view of the retaining element of FIG. 2.

On the basis of FIG. 3 it can be seen that a helically-shaped surface 88 is provided at the end face of the head 80 of the retaining element 70 that partially surrounds the opening 86. The helically-shaped surface 88 approaches (in the azimuthal direction) successively the end face of the head 80, with increasing distance from the contour of the opening 86, through which the locking element 84 is inserted. The surface 88 comprises an azimuthal angle region of approximately 120°. At its end spaced away from the aforementioned contour of the opening 86 a recess 90 in the form of an axial depression is provided in the helically-shaped surface 88. The locking element 84 comes into contact with the helically-shaped surface 88, when the bolt 62 is inserted into the retaining element 70.

In order to perform the locking, the bolt 62 is inserted into the opening 86 of the retaining element 70 and rotated by means of an appropriate tool applied to its head 74 (wrench), so that the locking element 84 rotates in counterclockwise direction as seen in FIG. 2 when the fastening arrangement is viewed from the left. Due to the helical shape of the surface 88 the bolt 62 is drawn more and more into the retaining element 70 when it is rotated against the force of the spring 72. If the locking element 84, after crossing over the angular region of the surface 88, reaches the recess 90, then the spring 72 relaxes slightly; the locking element 84 is arrested there in its locking position. Then the spring 72 is clamped between the first sleeve 64 and the head 74 of the bolt 62.

Due to the fixing of the retaining element 70 against rotation in the mounting plate 60 it is no longer necessary to use a tool to restrain the retaining element 70 with a second tool.

The disassembly of the fastening arrangement for the purpose of inverting or replacing the blades 46 is performed by rotating the head 74 of the bolt 62 in the opposite direction (in FIG. 2 in the clockwise direction), where it is possible to bring the locking element 84 out of the locking position against the force of the spring 72 without any excessive torque, due to the relatively small depth of the recess 90 and/or a corresponding chamfer of the helically-shaped surface 88 in the region adjoining the recess 90. A tool to compress the spring 72 or to immobilize the retaining element 70 is not required. Due to the simple disassembly and assembly of the blades it becomes possible to replace them on the field in case of damage during the harvest. Then the bolt 62 can be removed from the retaining element 70, as soon as the locking element 84 is located over the region of the opening 86 associated with it.

In the assembled condition of the fastening arrangement the recess 90 has the effect of arresting the locking element 84 in the locking position. The straw chopper 42 can be operated normally. The blades 46 are suspended pendulously on the sleeves 64 and 68. Since the sleeves 64 and 68 are fixed against rotation on the retaining element 70, they do not rotate along with the blades 46. Thereby they cannot rotate or jerk the locking element 84 out of the recess 90.

Figure 5:
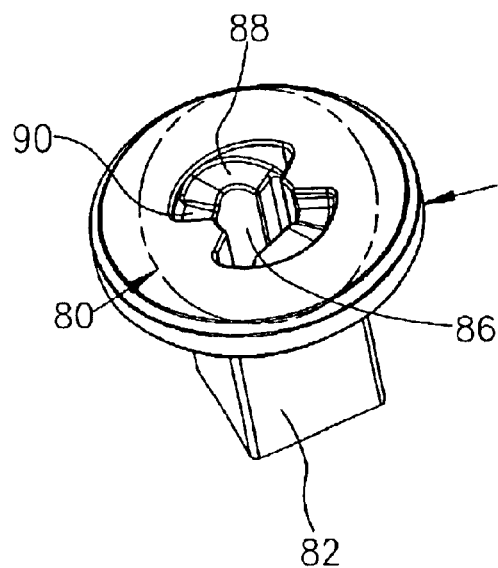
FIG. 5 is an enlarged perspective view of the retaining element of FIG. 4 from the outside.
Figure 6:
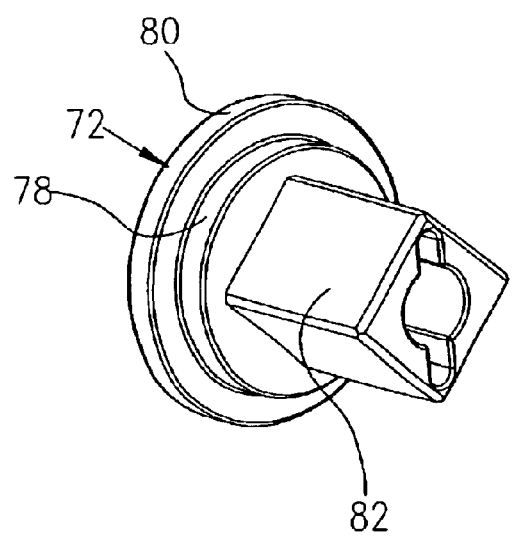
FIG. 6 is an enlarged perspective view of the retaining element of FIG. 4 from the inside.
Figure 4:
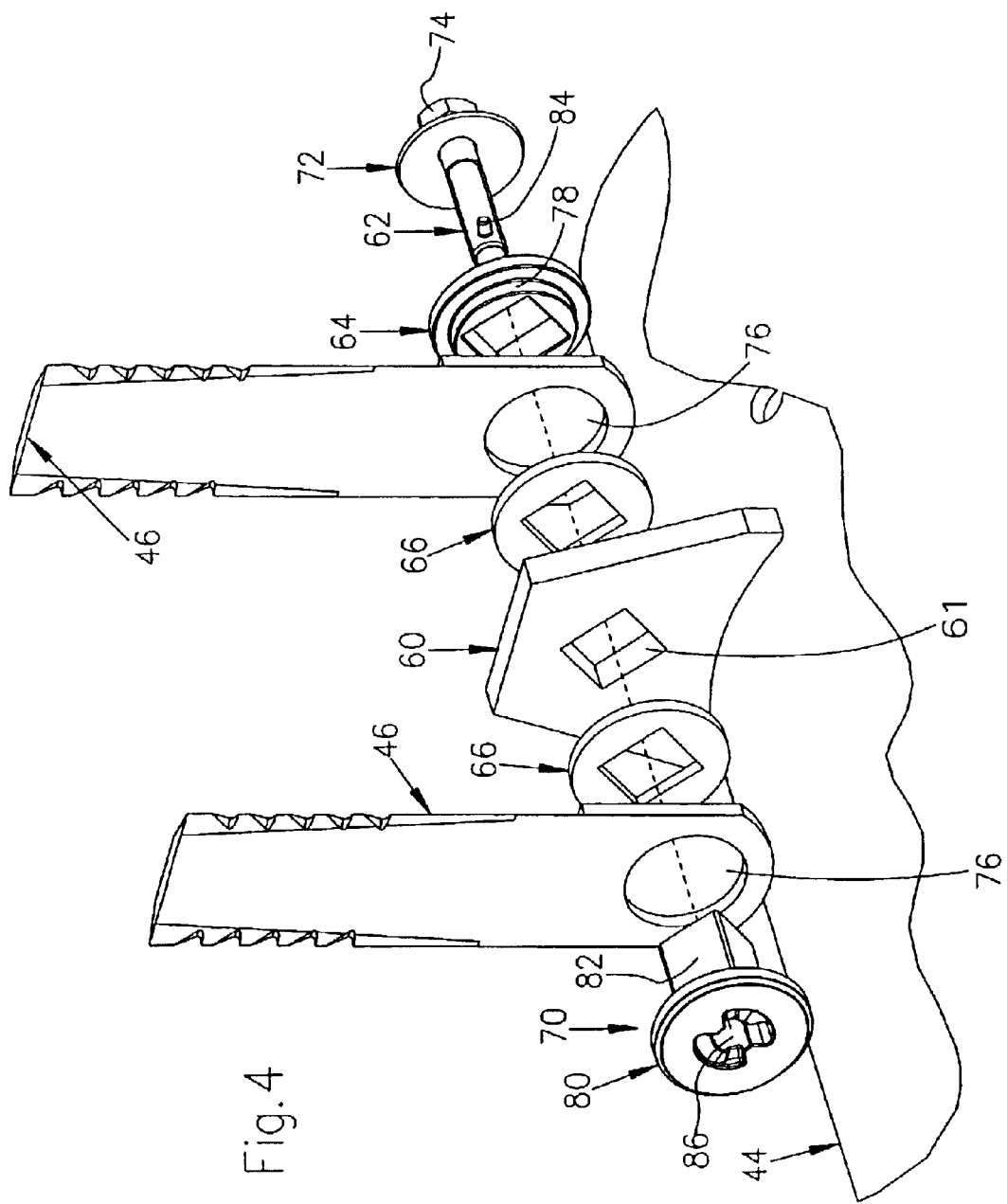
FIG. 4 is an exploded perspective view of a second embodiment of a fastening arrangement for the blades of the straw chopper.

FIGS. 4-6 show a second embodiment of a fastening arrangement according to the invention. Elements that conform to the first embodiment are characterized by the same number call-outs.

The second embodiment agrees generally with the first embodiment. There are, however, two differences worth noting. Only one sleeve 64 is provided. On the side of the mounting plate 60 facing the head 74 a second spacer 66 is provided (in place of the sleeve 68 of the first embodiment). The blade hole 76 of the blade 46, shown at the left in FIG. 4, is located on a circular cylindrical section 78 that adjoins the head 80 of the retaining element 70, as can best be seen in FIG. 6. Such a configuration can also be used in the embodiment with elliptical cross sections. It would also be conceivable to provide only two spacers 66 but no sleeve 64 on the side of the mounting plate 60 facing the head 74 of the bolt 62.

The cross sections of the elements used for the attachment of the retaining element 70, so that it is fixed against rotation to the mounting plate 60, that is, the plate hole 61 of the mounting plate 60 and the shank 82 of the retaining element 70 are not elliptical but square. The sleeve 64 and the spacers 66 are also provided with square holes.

The mounting plate 60, sleeves 64 and spacers 66 of both embodiments can be manufactured at low cost by stamping. Any desirable non-circular cross sections can be used in place of the elliptical or square cross sections of the shank 82 of the retaining element 70 and the plate hole 61 of the mounting plate 60, as well as the sleeves 64 and spacers 66. In that way a depression or projection extending axially in the shank 82 of the retaining element 70 would be conceivable, that interact with projecting or depressed regions of the other components named. The insertion of a feather key or another, separate component in a recess of the retaining element 70 would be conceivable for the production of an arrangement, fixed against rotation, of the retaining element 70 in the mounting plate 60.

Having described the illustrated embodiment, it will become apparent that various modifications can be made without departing from the scope of the invention as defined in the accompanying claims.

What is claimed is:

1. In combination with a chopper assembly for a harvesting machine, a fastening arrangement for fastening a blade to a rotor of the chopper assembly, the blade being pendulously supported on the rotor, the blade having a blade hole and the chopper assembly comprising the rotor and a mounting plate extending from the rotor, the fastening arrangement comprising a bolt that can be inserted into the blade hole in the blade and a plate hole in the mounting plate, the bolt being connected with a retaining element that retains the bolt in the holes, the retaining element can be separated from the bolt wherein the bolt and the retaining element are fixed against rotation by the mounting plate, the retaining element is inserted into the plate hole in the mounting plate and at least a portion of the retaining element that is inserted into the plate hole and the plate hole are provided with matching non-circular cross sections.

2. In combination with the chopper assembly for a harvesting machine and the fastening arrangement as defined by claim 1, wherein the bolt extends through an axial opening in the retaining element.

3. In combination with the chopper assembly for the harvesting machine and the fastening arrangement as defined by claim 2, wherein the blade is pendulously supported in bearings on the outer circumference of the retaining element surrounding the bolt.

4. In combination with the chopper assembly for the harvesting machine and the fastening arrangement as defined by claim 2, wherein the blade is pendulously supported in bearings on a sleeve surrounding the bolt.

5. In combination with the chopper assembly for the harvesting machine and the fastening arrangement as defined by claim 4, wherein the sleeve is connected to the mounting plate and fixed against rotation by the mounting plate.

6. In combination with the chopper assembly for the harvesting machine and the fastening arrangement as defined by claim 2, wherein the bolt and the retaining element that can be moved between a release position and a locking position by a rotation of less than 360 degrees.

7. In combination with the chopper assembly for the harvesting machine and the fastening arrangement as defined by claim 6, wherein the bolt and the retaining element are retained in the locked position by a spring.

8. In combination with the chopper assembly for the harvesting machine and the fastening arrangement as defined by claim 7, wherein a locking element is connected to the bolt and extends radially from the bolt and can be brought into contact with a helically-shaped surface on the retaining element, which is shaped in such a way that the spring is loaded into the locking position when the locking element is rotated relative to the retaining element and is unloaded when it is rotated into the release position.

9. In combination with the chopper assembly for the harvesting machine and the fastening arrangement as defined by claim 8, wherein the locking element that is located in a recess of the helically-shaped surface in the locking position.

10. In combination with the chopper assembly for the harvesting machine and the fastening arrangement as defined by claim 8, wherein the locking element is rigidly connected to the bolt and the bolt with the locking element are inserted through the axial opening in the retaining element.

11. A straw chopper for a harvesting machine, the straw chopper comprising:

a rotor having a plurality of outwardly extending mounting plates, each of the mounting plates having a non-circular plate hole;

a plurality of blades pendulously supported from the mounting plates, the blades being coupled to the mounting plates by a fastening assembly, each of the blades having a circular blade hole;

the fastening arrangement comprising a bolt that can be inserted into the blade hole in the blade and the plate hole in the mounting plate, the bolt being connected with a retaining element that retains the bolt in the holes, the retaining element can be separated from the bolt, wherein the bolt and the retaining element are fixed against rotation by the plate hole of the mounting plate.

12. A straw chopper as defined by claim 11 wherein the retaining element is inserted into the plate hole in the mounting plate and that at least a portion of the retaining element that is inserted in to the plate hole and the plate hole are provided, with matching non-circular cross sections.

13. A straw chopper as defined by claim 12 wherein the bolt extends through an axial opening in the retaining element.

14. A straw chopper as defined by claim 13 wherein the blade is pendulously supported in bearings on the outer circumference of the retaining element surrounding the bolt.

15. A straw chopper as defined by claim 13 wherein the blade is pendulously supported in bearings on a sleeve surrounding the bolt.

16. A straw chopper as defined by claim 15 wherein the sleeve is connected to the mounting plate and fixed against rotation by the mounting plate.

17. A straw chopper as defined by claim 13 wherein the bolt and the retaining element can be moved between a release position and a locking position by rotating the bolt relative to the retaining element.

18. A straw chopper as defined by claim 17 wherein the bolt and the retaining element are retained in the locked position by a spring.

19. A straw chopper as defined by claim 18 wherein a locking element is connected to the bolt and extends radially from the bolt and can be brought into contact with a helically-shaped surface on the retaining element, which is shaped in such a way that the spring is loaded into the locking position when the locking element is rotated relative to the retaining element and is unloaded when it is rotated into the release position.

\* \* \* \* \*